United States Patent
Chen et al.

(10) Patent No.: US 9,509,560 B2
(45) Date of Patent: Nov. 29, 2016

(54) UNIFIED CONFIGURATION FOR CLOUD INTEGRATION

(71) Applicants: Hongyu Chen, Palo Alto, CA (US); Karthik S J, Sunnyvale, CA (US)

(72) Inventors: Hongyu Chen, Palo Alto, CA (US); Karthik S J, Sunnyvale, CA (US)

(73) Assignee: SAP SE, Walldorf (DE)

(*) Notice: Subject to any disclaimer, the term of this patent is extended or adjusted under 35 U.S.C. 154(b) by 256 days.

(21) Appl. No.: 14/188,698

(22) Filed: Feb. 25, 2014

(65) Prior Publication Data

US 2015/0244567 A1 Aug. 27, 2015

(51) Int. Cl.
G06F 9/44 (2006.01)
H04L 12/24 (2006.01)
G06F 3/0481 (2013.01)
G06F 3/0484 (2013.01)
H04L 29/08 (2006.01)

(52) U.S. Cl.
CPC ......... H04L 41/0803 (2013.01); G06F 3/0481 (2013.01); G06F 3/04842 (2013.01); H04L 41/22 (2013.01); H04L 67/02 (2013.01)

(58) Field of Classification Search
None
See application file for complete search history.

(56) References Cited

U.S. PATENT DOCUMENTS

| | | | |
|---|---|---|---|
| 8,417,798 B2 | 4/2013 | Chen et al. | |
| 8,434,080 B2 | 4/2013 | Yendluri | |
| 8,452,864 B1 | 5/2013 | Vendrow | |
| 8,479,209 B2 | 7/2013 | Gebhart et al. | |
| 8,631,406 B2 | 1/2014 | Driesen et al. | |
| 8,671,392 B2 | 3/2014 | Jahr et al. | |
| 2002/0059425 A1 | 5/2002 | Belfiore et al. | |
| 2009/0100420 A1 | 4/2009 | Sapuntzakis et al. | |
| 2009/0249284 A1 | 10/2009 | Antosz et al. | |
| 2009/0276771 A1 | 11/2009 | Nickolov et al. | |
| 2010/0299366 A1 | 11/2010 | Stienhans et al. | |
| 2010/0306337 A1 | 12/2010 | DeHaan | |
| 2012/0102486 A1 | 4/2012 | Yendluri | |
| 2013/0085884 A1 | 4/2013 | O'Sullivan et al. | |
| 2014/0068576 A1 | 3/2014 | Pendap et al. | |
| 2015/0365275 A1* | 12/2015 | Iliev ................ H04L 41/5096 709/220 |

* cited by examiner

*Primary Examiner* — Chuck Kendall

(57) ABSTRACT

Various embodiments of systems and methods for unified configuration for cloud integration are described herein. In an aspect, the method includes rendering a unified configuration interface within a cloud application for performing cloud integration. The unified configuration interface includes a first widget to configure an external system for integration with the cloud application and a second widget to configure an integration flow (iflow) between the external system and the cloud application. The iflow defines data flow between the configured external system and the cloud application. Subsequent to receiving a confirmation of the selected iflow, integrating the external system with the cloud application to share data in the cloud.

20 Claims, 9 Drawing Sheets

NEW COMMUNICATION SYSTEM

| SAVE & CLOSE | SAVE | CLOSE | ACTIONS ▾ |

CONFIGURATION INFORMATION 310

*ID: [BOS]

XYZ SYSTEM: ☑
HOST NAME: [https://abc.corp]
*SYSTEM ACCESS TYPE: [INTERNET]

HCI SYSTEM: ☑
HOST NAME: [https://xyz.com]
*SYSTEM ACCESS TYPE: [INTERNET]

INTERNAL COMMENT 320

[                    ]

TECHNICAL CONTACT 330

FIRST NAME: [BAZ]
LAST NAME: [SJ]
EMAIL: [BAZ@YM.COM]
PHONE: [        ]
FAX: [        ]

UNIFIED CONFIGURATION FOR CLOUD INTEGRATION

BACKGROUND

Cloud integration facilitates integration of systems or applications for sharing data in cloud. For example, cloud integration facilitates integration of an on-premise application such as a customer relationship management (CRM) application and a cloud application for sharing data in the cloud. In general, the cloud integration of the on-premise application and the cloud application involves configuration at multiple levels including a configuration at a cloud application level and a configuration at a cloud integration platform level. The cloud integration platform is a middleware between the cloud application and the on-premise application. However, performing configuration at multiple levels for integration of on-premise and cloud applications not only requires knowledge regarding multiple configuration tools but is also time consuming and labour intensive.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 3 illustrates a graphical user interface for configuring a communication system to be linked to the cloud application, according to an embodiment.

DESCRIPTION

Figure 1:
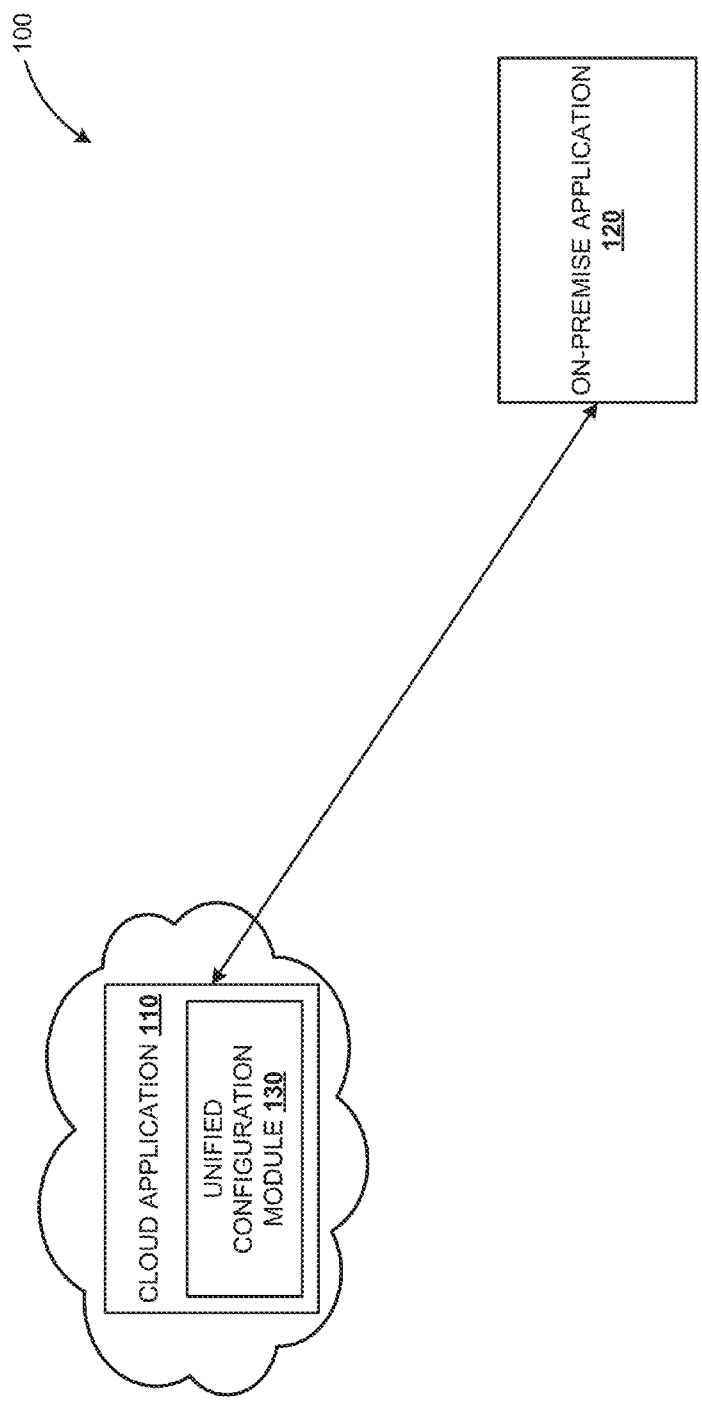
FIG. 1 illustrates an overview of an exemplary cloud integrated environment comprising a unified configuration module for linking a cloud application and an on-premise application, according to an embodiment.

Embodiments of techniques for unified configuration for cloud integration are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A "cloud application" refers to an application that functions in the cloud. The cloud application can be accessed through a web browser from a communication device connected to an internet. The cloud application may be provided as 'SaaS' (software-as-a-service), 'PaaS' (platform-as-a-service), or 'IaaS' (infrastructure-as-a-service).

Software-as-a-service (SaaS) refers to a software delivery model in which software applications and associated data are centrally hosted on the cloud. SaaS applications include, but are not limited to, accounting, collaboration, customer relationship management (CRM), management information systems (MIS), enterprise resource planning (ERP), etc. SaaS applications are hosted centrally where software and data are stored on servers. The SaaS applications can run on a computer with an internet connection and a web browser.

Platform-as-a-service (PaaS) is a service delivery model in which software applications can be created, deployed, and hosted. PaaS also facilitates various integrated services including, but not limited to, testing, team collaboration, web service, cloud integration, storage, application versioning, monitoring, workflow management, etc. One such PaaS offering is a cloud integration platform such as HANA® cloud integration (HCI) platform for connecting the SaaS application and an on-premise application.

An "Integration flow (iflow)" refers to a graphical representation defining the flow of data between systems or applications such as the on-premise application and the cloud application. In an embodiment, the iflow is created to define a structure in which the business applications can be linked or integrated. In an embodiment, a cloud integration platform includes plug-ins to create and/or define iflows.

The term "communication system" refers to a system involved in cloud integration. The communication system may be an external or an on-premise system which includes an on-premise application. The communication system is configured to enable cloud integration for exchanging data between the on-premise application and the cloud application.

The term "communication arrangement" refers to communication data such as iflows, authentication certificates, etc., used for connecting the communication systems. Based upon the communication data, the cloud application is integrated with the external application or system. In an embodiment, the communication arrangement includes data related to an inbound and outbound communication. The inbound communication refers to flow of data from the external system to the cloud application and the outbound communication refers to flow of data from the cloud application to the external system.

In general, cloud integration for connecting an on-premise application and a cloud application involves performing configuration within at least the cloud application(s) and the cloud integration platform (e.g., HCI). The cloud integration platform is a middleware between the cloud applications and the on-premise applications. Typically, iflows are configured at the cloud integration platform whereas the communication systems and communication data are configured at the cloud applications. However, it may be laborious and time consuming to perform configuration at multiple different locations, e.g., the cloud application and the cloud integration platform. The following embodiments describe the technique of performing configuration in a unified manner at a single location.

FIG. 1 is a block diagram illustrating cloud integration environment 100 including a cloud application 110, an on-premise application 120, and a unified configuration module 130 within the cloud application 110 to integrate the cloud application 110 and the on-premise application 120. The cloud application 110 may be an SaaS application. The cloud application 110 includes the unified configuration module 130 to integrate the cloud application 110 with the on-premise application 120. The term integration as used herein refers to linking or connecting the cloud application 110 and the on-premise application 120 for sharing data. The unified configuration module 130 comprises wizard based user interfaces (UIs) for performing configuration for cloud integration at a single location. In an embodiment, the unified configuration module 130 provides interface for configuring "communication systems." A communication system may be an external or an on-premise system which includes the on-premise application. For integrating the cloud application 110 and the on-premise application 120, the cloud application 110 may be integrated with the communication system having the on-premise application 120. The unified configuration module 130 also provides an interface for receiving selection of an iflow for defining data flow between the communication system and the cloud application 110. Based on the selected iflow, the communication system including the on-premise application 120 is integrated with the cloud application 110 to share data in the cloud.

Figure 2:
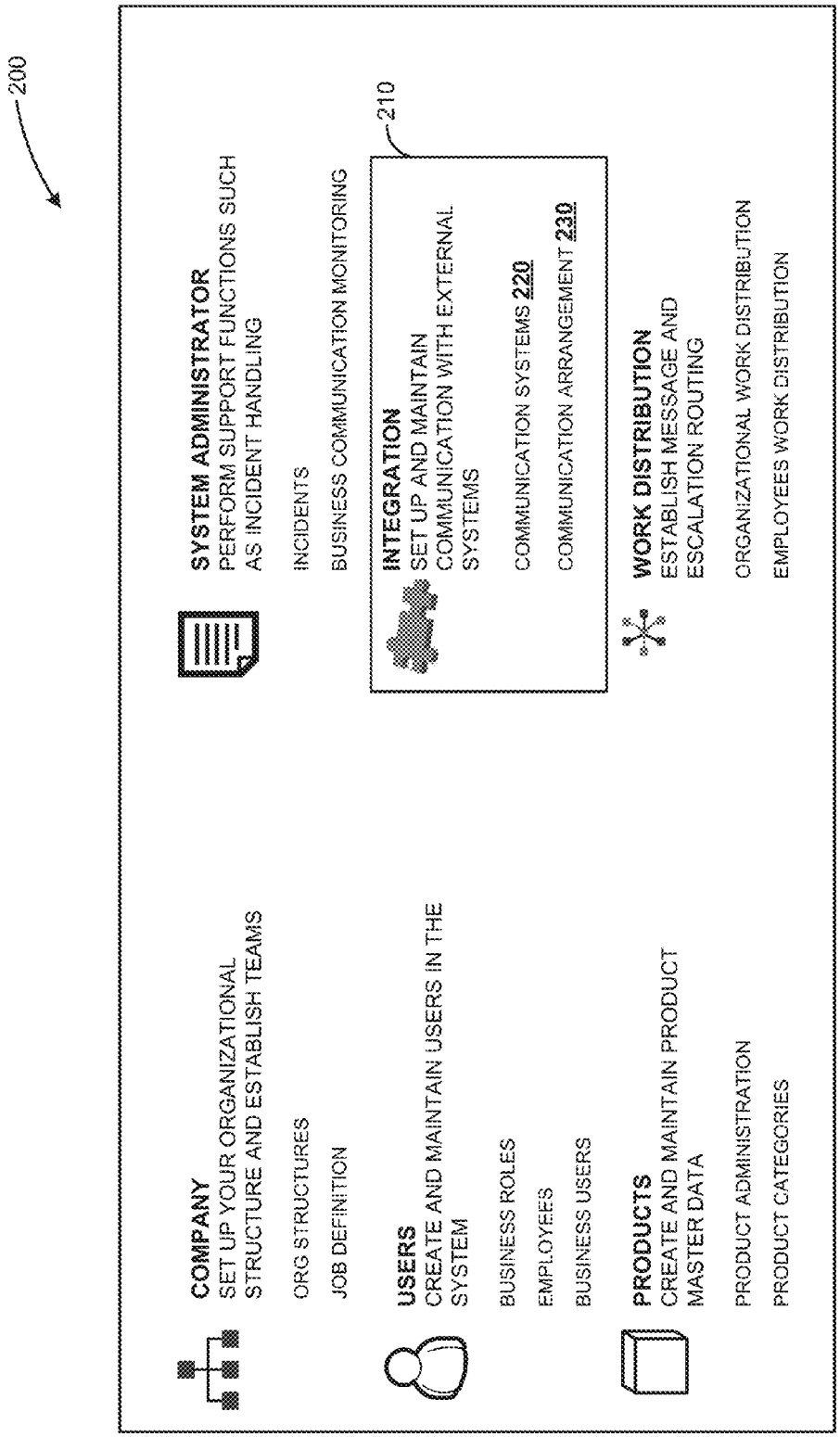
FIG. 2 illustrates a graphical user interface within the unified configuration module for performing cloud integration, according to an embodiment.

FIG. 2 shows a unified configuration interface 200 for performing cloud integration. In an embodiment, the unified configuration interface 200 is rendered in response to receiving, a command for integrating one or more on-premise applications with one or more cloud applications, by the unified configuration module 130. As shown in FIG. 2, the unified configuration interface 200 includes an integration widget 210 for integrating the cloud application and the communication system having the on-premise application. The term integration as used herein refers to linking or connecting the cloud application 110 and the on-premise application 120 for sharing data. The integration widget 210 includes a menu having user-selectable options namely 'communication systems' 220 and 'communication arrangement' 230. The 'communication systems' 220 option may be selected to configure the communication system(s) for cloud integration. e.g., an external or an on-premise system. The on-premise system may refer to a computing device within the premise of a user or organization. In an aspect, upon receiving a selection of 'communication systems' 220 option, the unified configuration module 130 renders a user interface (e.g., UI 300 of FIG. 3) for configuring an external system or an on-premise system for integration with the cloud application. The 'communication arrangement' 230 option may be selected to configure various communication data including iflows defining communication between the external system and the cloud application. In an aspect, upon receiving a selection of the 'communication arrangement' 230 option, the unified configuration module 130 renders a user interface (e.g., UI 400 of FIG. 4) for configuring the communication data between the cloud application and the external system. For example, the 'rendered interface (UI 400) provides a list of iflows and enables the selection of an iflow from the listed iflows for defining the flow of data from the external system to the cloud application.

FIG. 3 shows an exemplary user interface 300 for configuring one or more on-premise communication systems that may be integrated with the cloud application. The interface 300 is displayed in response to receiving a selection of the 'communication systems' 220 option in the unified configuration interface 200. The interface 300 includes various data fields for receiving configuring information 310 relating to the on-premise communication system. In an embodiment, the interface 300 includes data fields for receiving information related to the communication system such as an identifier (ID) for the communication system, HCI status, host name, access type, etc. The HCI enabled system refers to the system that can be integrated to the cloud application using iflows. In the HCI enabled system, one of the pre-defined iflows can be selected and deployed to define data flow between the HCI enabled system and the cloud application. When the system is not HCI enabled, it can be integrated with the cloud application using a direct point-point connection. Information relating to host name and access type for the HCI system are received via appropriate fields. The UI 300 further includes a comment section 320 for receiving any comments or instructions relating to the communication system. The sub-section 'Technical contact' 330 includes data fields for receiving personal information such as name, contact number, email_id, fax, etc., relating to a user configuring the communication system.

Figure 4:
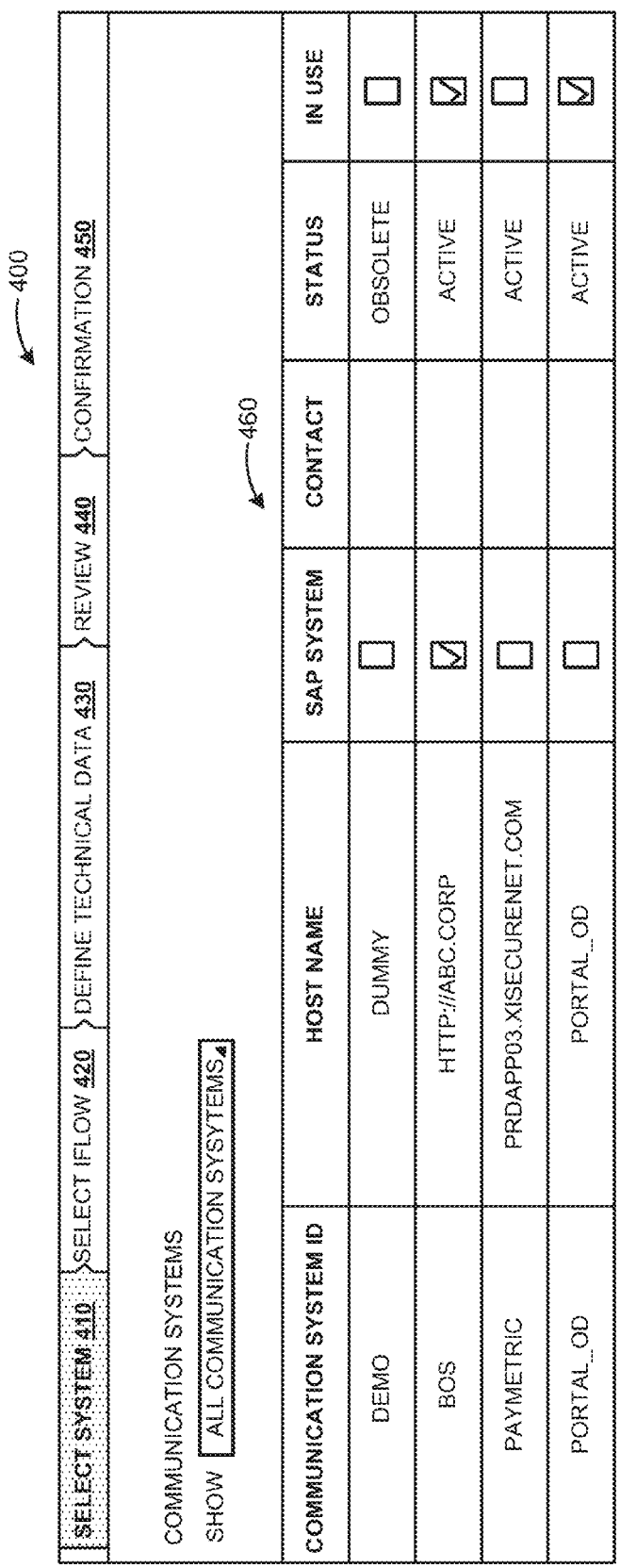
FIG. 4 illustrates a graphical user interface showing a list of available communication systems, according to an embodiment.

Subsequent to configuring the communication system, a user may select the 'communication arrangement' 230 option for providing communication data required to execute the integration of the communication system with the cloud application. FIG. 4 shows exemplary user interface 400 that is rendered in response to receiving a selection of the 'communication arrangement' 230 option. The user interface 400 includes multiple tabs such as 'select system 410.' 'select iflow 420,' define technical data 430,' 'review 440,' and 'confirmation 450.' The selection of 'select system' tab 410 may display a list of configured communication systems which may be selected for integration. In an embodiment, when the 'select system' tab 410 is selected, all configured communication systems are displayed in section 460. Subsequently, one or more of the displayed communication systems such as a HCI enabled system may be selected. The 'properties' information pertaining to the displayed communication systems may be viewed to determine whether the communication system is HCI enabled or not. In an embodiment, section 460 may include a 'HCI system' column (not shown) to indicate whether the communication system is HCI enabled or not. The HCI enabled system can be integrated with the cloud application using an iflow. Subsequent to selecting the communication system, the 'select iflow' tab 420 may be selected for selecting an iflow from a list of available iflows to define flow of data from the HCI enabled system to the cloud application or vise versa. The UI 400 further includes 'define technical data' tab 430 for defining technical data such as sender and receiver certificate, authentication protocol, etc., the 'review tab' 440 for reviewing selected communication data, and the confirmation tab 450 to confirm and finalize the selected communication data including the selected iflow.

Figure 5:
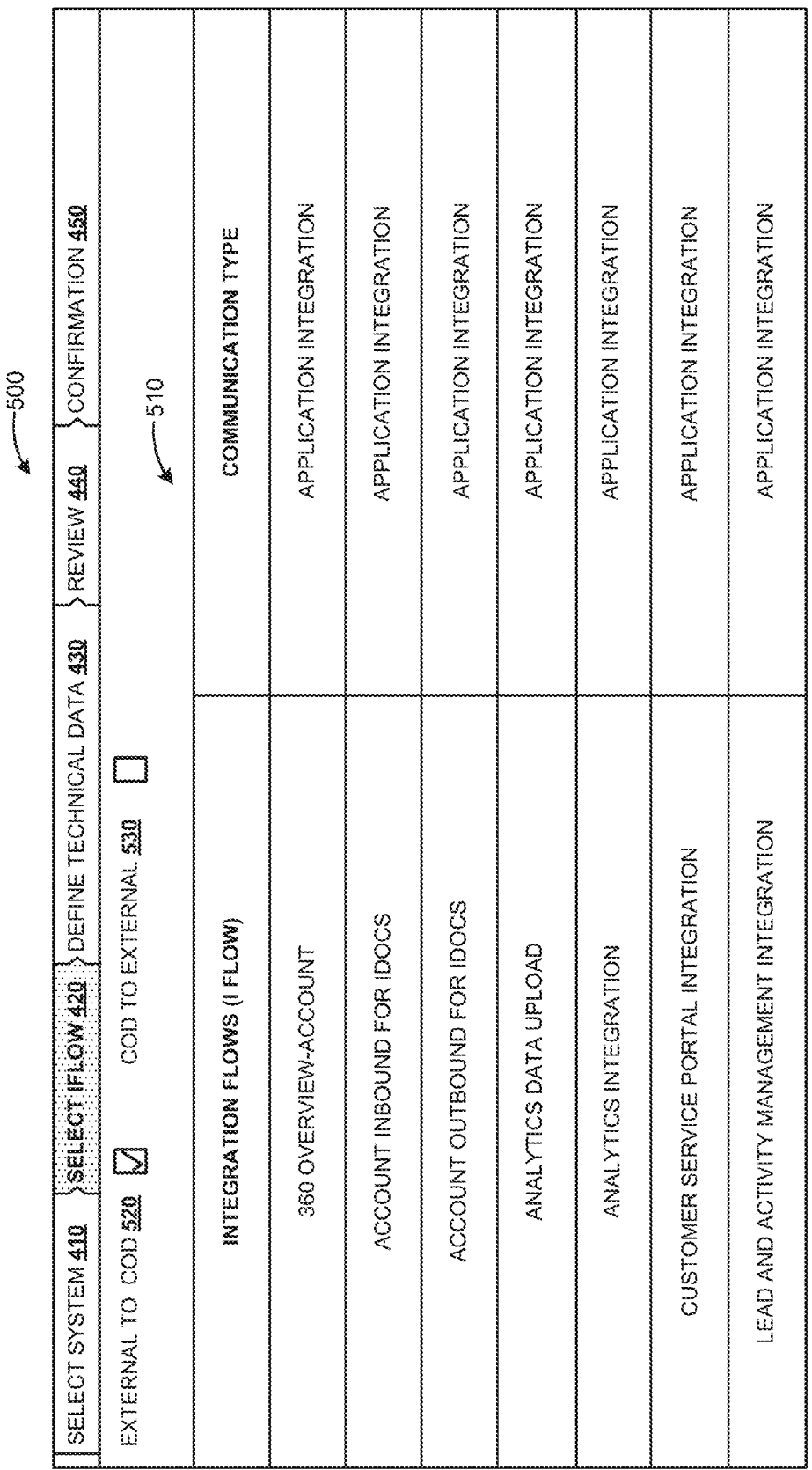
FIG. 5 illustrates a graphical user interface showing a list of available integration flows (iflows) between the communication system and the cloud application, according to an embodiment.

FIG. 5 shows exemplary user interface 500 displayed in response to receiving a selection of 'select iflow' tab 420

(FIG. 4). The rendered UI 500 provides a list of available iflows 510 which may be selected by a user. In an embodiment, the iflows are imported from the cloud integration platform to the cloud application 110. In an embodiment, the iflows for an inbound communication and outbound communication are defined separately. The inbound communication refers to flow of data from the external system to the cloud application (EXTERNAL to COD) whereas the outbound communication refers to flow of data from the cloud application to the external system (COD to EXTERNAL). The UI 500 includes a tab 'EXTERNAL to COD' 520 to indicate whether the iflow configuration is for inbound communication, i.e., from the external system to the cloud or not, and a tab 'COD to EXTERNAL' 530 to indicate whether the iflow configuration is for outbound communication. i.e., from COD to external system or not. The user may select the iflow for the inbound communication by selecting 'EXTERNAL to COD' 520. Similarly, the user may select the iflow for the outbound communication by selecting 'COD to EXTERNAL' 530. In an embodiment, when both the inbound and outbound tabs 520 and 530 are selected, the unified configuration module 130 assigns suitable iflow from the selected iflows to the corresponding inbound and the outbound communication by determining whether the iflow is defined for the inbound communication or outbound communication. In an embodiment, the iflows defined for the inbound communication are pre-packaged under 'EXTERNAL to COD' and the iflows defined for the outbound communication are pre-packaged under 'COD to EXTERNAL.' Therefore, the cloud backend identifies which selected iflow is to be assigned to the inbound and the outbound communication. When user selects both iflows from the same category, e.g., two iflows belonging to 'EXTERNAL to COD,' an error message may be displayed prompting user to provide relevant input.

Figure 6:
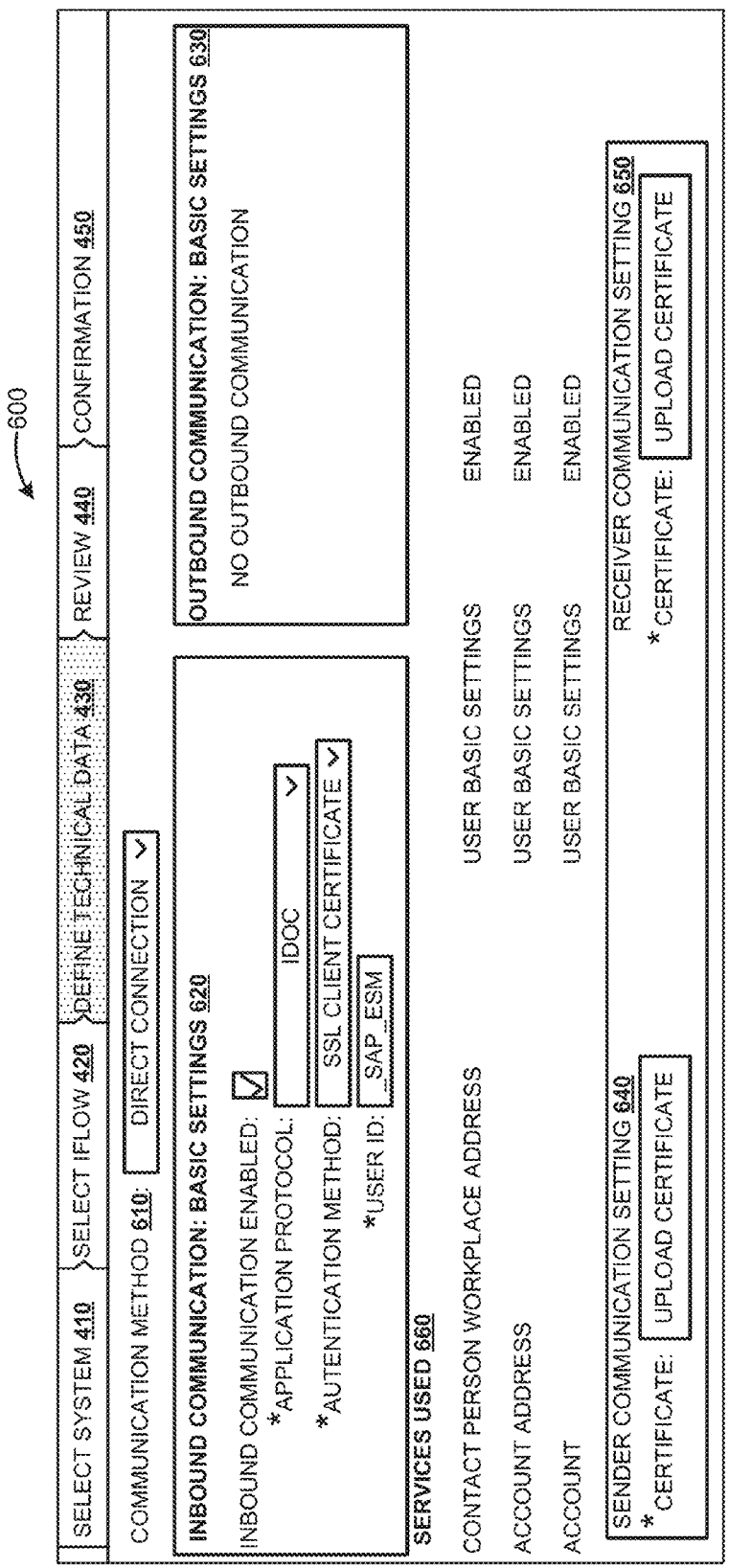
FIG. 6 illustrates a graphical user interface for receiving information related to an inbound and an outbound communication, according to an embodiment.

Subsequent to selecting the iflows, the 'define technical data' tab 430 (FIG. 4) may be selected to define various technical data related to the communication. FIG. 6 shows exemplary user interface 600 for defining the technical data. The interface 600 is displayed upon receiving a selection of 'define technical data' tab 430 from the UI 400. The UI 600 includes fields for defining technical data, such as a communication method 610 for describing the type of connection between the cloud application and the on-premise system. The connection can be of various types such as a direct connection, a simple object access protocol (SOAP) connection, etc. The user may specify the communication method using a dropdown menu as shown in FIG. 6. The UI 600 further includes information on inbound communication (e.g., as basic settings 620). The technical data includes data related to the inbound and outbound communications. The inbound communication basic settings 620 include fields for receiving inputs related to inbound communications. Such inputs include information to enable the inbound communication, e.g., name of application protocol used for receiving messages in the inbound communication, authentication method used for the inbound communication, and user ID to identify the user of the external system. Similarly, the UI 600 includes the outbound communication basic settings 630. As shown, because the user has not selected the tab 'COD to EXTERNAL' 530 (FIG. 5) therefore, none of the fields are displayed under the outbound communication basic settings 630. The UI 600 also includes information about sender communication setting 640 and receiver communication setting 650. The sender communication setting 640 indicates sender's certificate to authenticate the sender and the receiver communication setting 650 indicates receiver's certificate to authenticate the receiver. The UI 600 also includes 'services used' 660 data to provide information related to a user configuring the technical data and information related to account created for the external or the on-premise system.

Figure 7:
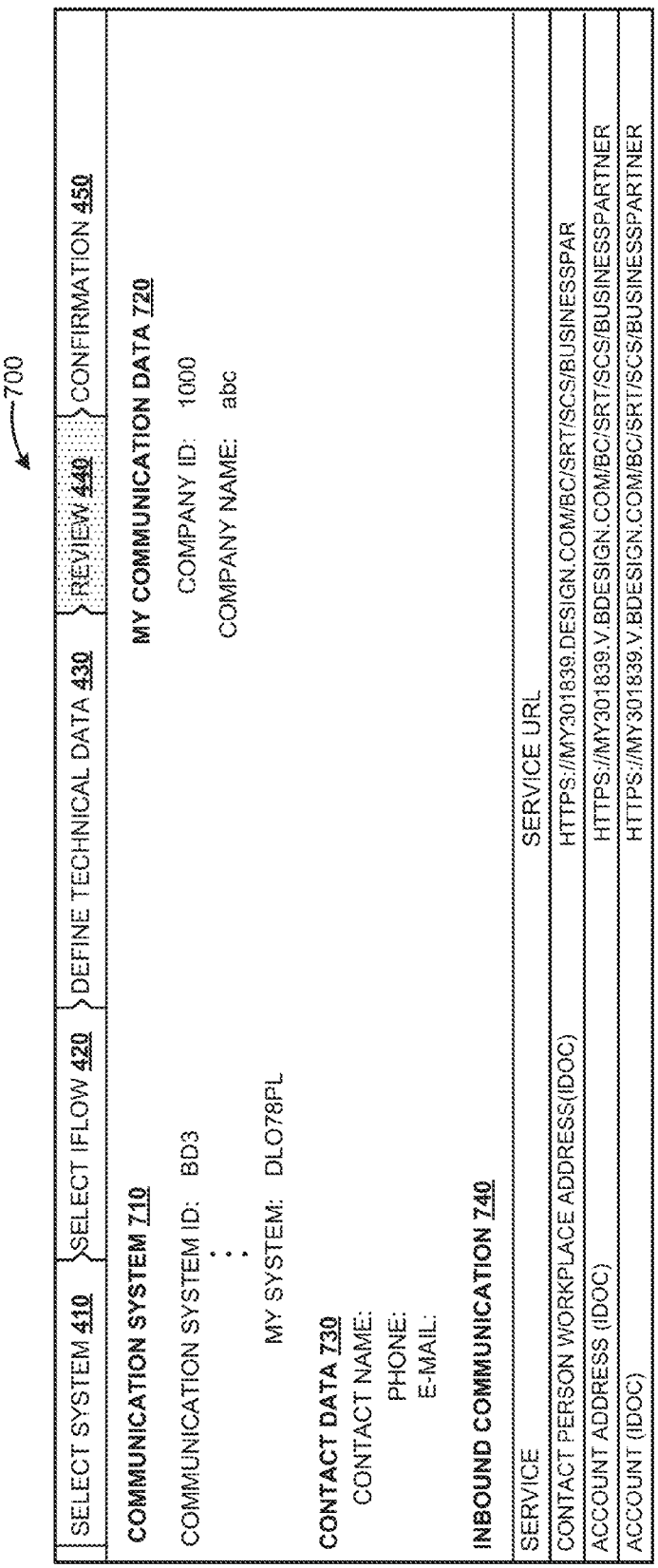
FIG. 7 illustrates a graphical user interface for reviewing communication data provided by a user, according to an embodiment.

The configured communication data and the selected configured communication system can be reviewed to determine if the selection is made appropriately. FIG. 7 shows review interface 700 which is displayed upon receiving a selection of review tab 440 from the UI 400. The review interface 700 displays the communication data and system selected by the user, e.g., data related to inbound communication 740, communication system 710 involved in the cloud integration, communication data 720 related to company involved in the cloud integration, contact data 730 related to the contact person such as name, email_id, etc. Once the selections are reviewed and affirmed, the confirmation tab 450 (FIG. 4) may be selected to confirm the selected communication data and system. Upon confirmation, the selected iflow is automatically deployed on the external system and the external system gets integrated with the cloud application for sharing data.

Figure 8:
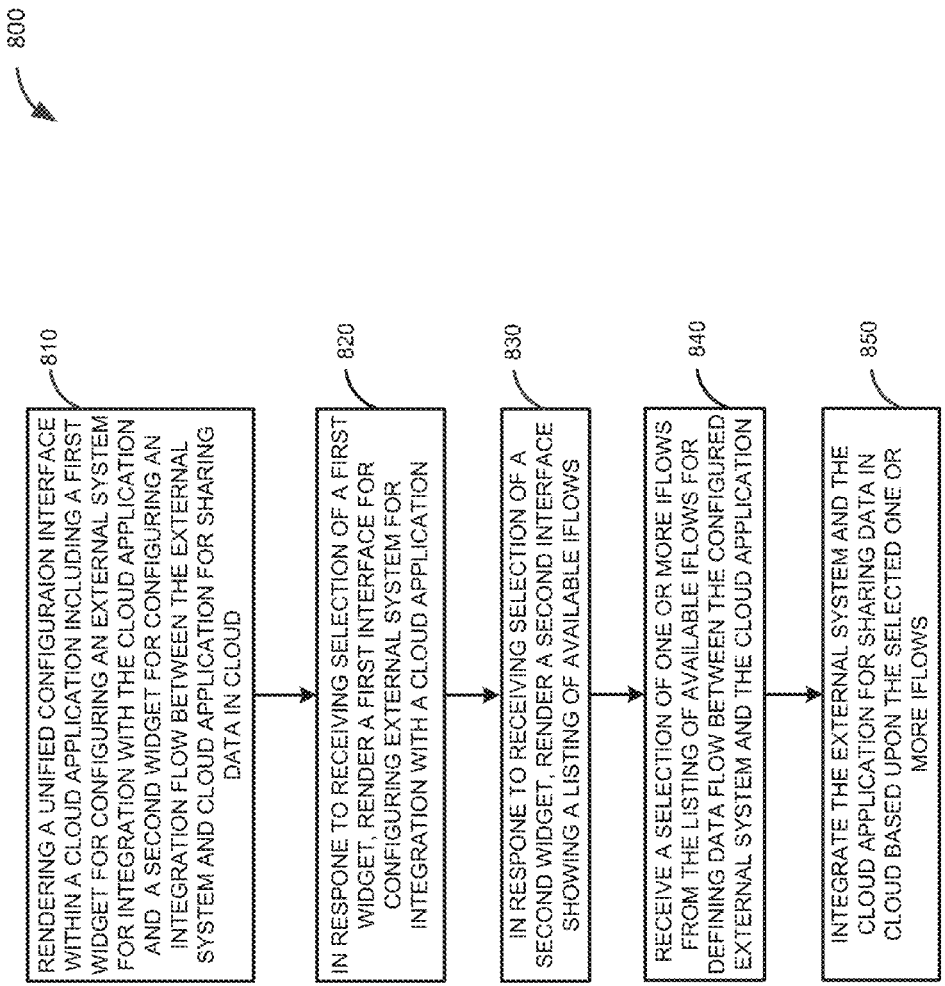
FIG. 8 is a flow chart for a process of performing unified configuration for cloud integration, according to an embodiment.

FIG. 8 is a flowchart illustrating process 800 to enable performing cloud integration using unified configuration module (e.g., unified configuration module 130 of FIG. 1) within a cloud application. At 810, a unified configuration interface (e.g., interface 200 of FIG. 2) including a first and a second widget (e.g., options 'communication systems' 220 and 'communication arrangement' 230) is rendered within the cloud application. In an embodiment, the widgets represent respective cloud integration operation for performing cloud integration. The first widget (e.g., 'communication systems' 220) enables configuring external system including on-premise application for integration with the cloud application. Upon receiving selection of the first widget, a first interface (e.g., user interface 300 of FIG. 3) is rendered for configuring the external system for integration with the cloud application at 820. The second widget (e.g., 'communication arrangement' 230) enables receiving communication data (e.g., receiving selection of iflows) required to execute the integration of the external system with the cloud application. Upon receiving selection of the second widget, a second interface (e.g., user interface 400 of FIG. 4) is rendered showing a listing of available iflows at 830. A selection of one or more iflows from the listing of available iflows is received for defining data flow between the external system and the cloud application at 840. Based upon the selected one or more iflows, the external system is integrated with the cloud application for sharing data in the cloud at 850.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
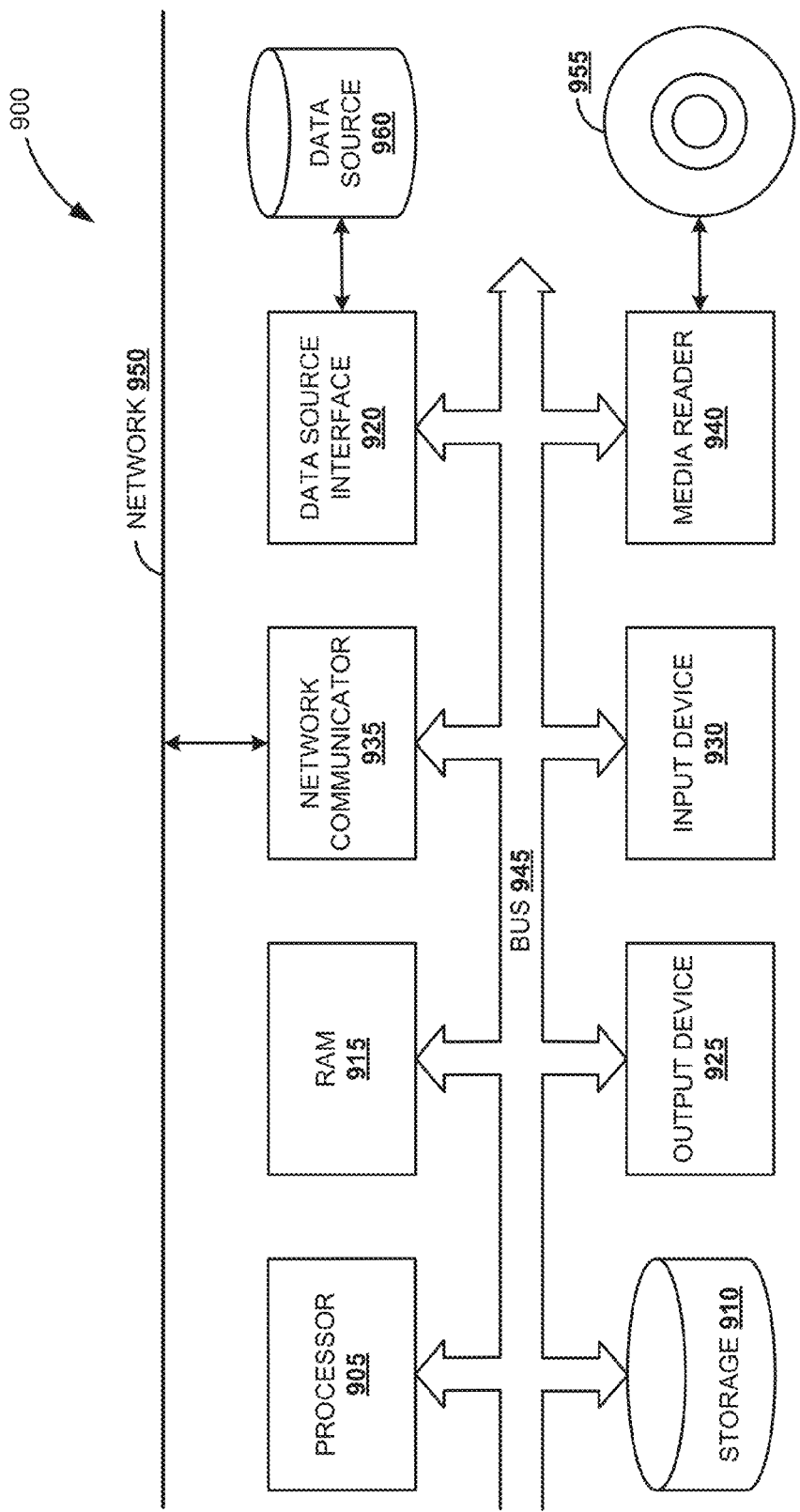
FIG. 9 is a block diagram of an exemplary computer system, according to an embodiment.

FIG. 9 is a block diagram of an exemplary computer system 900. The computer system 900 includes a processor 905 that executes software instructions or code stored on a computer readable storage medium 955 to perform the above-illustrated methods. The processor 905 can include a plurality of cores. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, all of the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. The output devices 925 and input devices 930 could be joined by one or more additional peripherals to further expand the capabilities of the computer system 900.

A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an ERP system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computing device cause the computing device to perform operations comprising:
    invoking a configuration interface within a cloud application, wherein the configuration interface includes:
        a first widget representing a first cloud integration operation for configuring an external system for integration with the cloud application; and
        a second widget representing a second cloud integration operation for configuring an integration flow (iflow) between the external system and the cloud application;
    in response to receiving a selection of the first widget, rendering a first interface for configuring the external system for integration with the cloud application;
    in response to receiving a selection of the second widget, rendering a second interface showing a listing of available iflows;
    receiving a selection of one or more iflows from the listing of available iflows for defining data flow between the configured external system and the cloud application; and
    integrating, based upon the selected one or more iflows, the external system and the cloud application to share data in a server system.

2. The computer readable medium of claim 1, wherein the cloud application comprises an on-demand application and wherein the external system comprises an on-premise system.

3. The computer readable medium of claim 1, wherein the external system is a cloud integration enabled system.

4. The computer readable medium of claim 1, wherein the external system is configured by providing:
    an identifier for the external system; and
    information identifying whether the external system is a cloud integration enabled system, wherein when the external system is the cloud integration enabled system providing a host name for the cloud integration enabled system and an access type for the cloud integration enabled system.

5. The computer readable medium of claim 1, wherein the integration flow (iflow) defines data flow for at least one of:
    an inbound communication, wherein the inbound communication represents communication from the external system to the cloud application; and
    an outbound communication, wherein the outbound communication represents communication from the cloud application to the external system.

6. The computer readable medium of claim 1, wherein the second interface further includes fields for receiving information relating to an inbound communication and an outbound communication.

7. The computer readable medium of claim 6, wherein the information relating to the inbound communication includes at least one of a communication protocol used for the inbound communication and an authentication method used for the inbound communication and wherein the information relating to the outbound communication includes at least one of a communication protocol used for the outbound communication and an authentication method used for the outbound communication.

8. The computer readable medium of claim 7, wherein when the authentication method comprises certificate authentication, the second interface further includes information about sender's certificate and receiver's certificate to authenticate the inbound and the outbound communication.

9. A computer-implemented method for unified configuration for cloud integration comprising:
    invoking, by at least one processor of a computing device, a configuration interface within a cloud application, wherein the configuration interface includes:
        a first widget representing a first cloud integration operation for configuring an external system for integration with the cloud application; and
        a second widget representing a second cloud integration operation for configuring an integration flow (iflow) between the external system and the cloud application;
    in response to receiving a selection of the first widget, rendering, by the at least one processor, a first interface for configuring the external system for integration with the cloud application;
    in response to receiving a selection of the second widget, rendering, by the at least one processor, a second interface showing a listing of available iflows;
    receiving, by the at least one processor, a selection of one or more iflows from the listing of available iflows for defining data flow between the configured external system and the cloud application; and
    integrating, by the at least one processor and based upon the selected one or more iflows, the external system and the cloud application to share data in cloud.

10. The computer-implemented method of claim 9 further comprising receiving, by the at least one processor, a confirmation of the selected one or more iflows.

11. The computer-implemented method of claim 9, wherein the integration flow (iflow) defines data flow for at least one of:
    an inbound communication, wherein the inbound communication represents communication from the external system to the cloud application; and
    an outbound communication, wherein the outbound communication represents communication from the cloud application to the external system.

12. A computer system for unified configuration for cloud integration comprising:
    at least one memory to store executable instructions; and
    at least one processor communicatively coupled to the at least one memory, the at least one processor configured to execute the executable instructions to:
        invoke a configuration interface within a cloud application, wherein the configuration interface includes:
            a first widget representing a first cloud integration operation for configuring an external system for integration with the cloud application; and
            a second widget representing a second cloud integration operation for configuring an integration flow (iflow) between the external system and the cloud application;
        in response to receiving a selection of the first widget, render a first interface for configuring the external system for integration with the cloud application;
        in response to receiving a selection of the second widget, render a second interface showing a listing of available iflows;
        receive a selection of one or more iflows from the listing of available iflows for defining data flow between the configured external system and the cloud application; and integrate, based upon the selected one or more iflows, the external system and the cloud application to share data in cloud.

13. The computer system of claim 12, wherein the cloud application comprises an on-demand application and wherein the external system comprises an on-premise system.

14. The computer system of claim 12, wherein the external system is a cloud integration enabled system.

15. The computer system of claim 12, wherein the integration flow (iflow) defines data flow for at least one of:
   an inbound communication, wherein the inbound communication represents communication from the external system to the cloud application; and
   an outbound communication, wherein the outbound communication represents communication from the cloud application to the external system.

16. The computer system of claim 12, wherein the second interface further includes fields for receiving information relating to an inbound communication and an outbound communication.

17. The computer system of claim 16, wherein the information relating to the inbound communication includes at least one of a communication protocol used for the inbound communication and an authentication method used for the inbound communication and wherein the information relating to the outbound communication includes at least one of a communication protocol used for the outbound communication and an authentication method used for the outbound communication.

18. The computer system of claim 17, wherein when the authentication method comprises certificate authentication, the second interface further includes information about sender's certificate and receiver's certificate to authenticate the inbound and the outbound communication.

19. The computer system of claim 12, wherein the at least one processor is further configured to execute the executable instructions to receive a confirmation of the selected one or more iflows.

20. The computer system of claim 12, wherein the iflow comprises graphical representation defining data flow from one of:
   the external system to the cloud application; and
   the cloud application to the external system.

* * * * *